(12) United States Patent
Tang

(10) Patent No.: US 11,234,238 B2
(45) Date of Patent: Jan. 25, 2022

(54) METHOD FOR RESOURCE CONFIGURATION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 95 days.

(21) Appl. No.: 16/626,849

(22) PCT Filed: Sep. 15, 2017

(86) PCT No.: PCT/CN2017/101951
§ 371 (c)(1),
(2) Date: Dec. 26, 2019

(87) PCT Pub. No.: WO2019/051803
PCT Pub. Date: Mar. 21, 2019

(65) Prior Publication Data
US 2020/0229188 A1 Jul. 16, 2020

(51) Int. Cl.
*H04W 72/04* (2009.01)
*H04W 4/40* (2018.01)

(52) U.S. Cl.
CPC ......... *H04W 72/0453* (2013.01); *H04W 4/40* (2018.02)

(58) Field of Classification Search
CPC ............. H04W 72/0453; H04W 72/04; H04W 72/0413; H04W 72/042; H04W 72/048; H04W 72/02; H04W 4/40; H04W 92/18
See application file for complete search history.

(56) References Cited

U.S. PATENT DOCUMENTS

2011/0075640 A1* 3/2011 Mo .................. H04L 5/0053
370/336
2014/0247802 A1 9/2014 Wijting
(Continued)

FOREIGN PATENT DOCUMENTS

| CN | 101389054 A | 3/2009 |
| CN | 101959251 A | 1/2011 |

(Continued)

OTHER PUBLICATIONS

Second Office Action of the Chinese application No. 201780090648.4, dated Sep. 15, 2020.
(Continued)

*Primary Examiner* — Farid Seyedvosoghi
(74) *Attorney, Agent, or Firm* — Ladas & Parry LLP

(57) ABSTRACT

Provided are a method for resource configuration, a terminal device and a network device. The method includes that: first information is transmitted to a network device, the first information including capability information for indicating a capability in simultaneous transmission and reception on multiple carriers, the multiple carriers includes a first-type carrier and a second-type carrier, the first-type carrier is for transmitting data on SL and the second-type carrier is for transmitting data on at least one of UL, DL and the SL; and second information from the network device is received, the second information being for indicating a first transmission resource, allocated by the network device, for the first-type carrier and the second-type carrier and a valid time of the first transmission resource.

16 Claims, 7 Drawing Sheets

(56) References Cited

U.S. PATENT DOCUMENTS

| | | | |
|---|---|---|---|
| 2015/0071207 A1 | 3/2015 | Seo et al. | |
| 2015/0312923 A1 | 10/2015 | Guo | |
| 2016/0037322 A1 | 2/2016 | Nguyen et al. | |
| 2016/0338019 A1* | 11/2016 | Ratasuk | H04W 72/042 |
| 2016/0338094 A1 | 11/2016 | Faurie et al. | |
| 2017/0164399 A1 | 6/2017 | Seo et al. | |
| 2017/0245247 A1 | 8/2017 | Suzuki et al. | |
| 2017/0318546 A1* | 11/2017 | Suzuki | H04W 52/34 |
| 2018/0167904 A1* | 6/2018 | Lee | H04W 72/042 |
| 2019/0357025 A1 | 11/2019 | Hwang et al. | |
| 2020/0068593 A1* | 2/2020 | Seo | H04W 76/14 |
| 2020/0170059 A1* | 5/2020 | Belleschi | H04W 16/14 |

FOREIGN PATENT DOCUMENTS

| | | |
|---|---|---|
| CN | 103874205 A | 6/2014 |
| CN | 104247300 A | 12/2014 |
| CN | 107148798 A | 9/2017 |
| EP | 3547778 A1 | 10/2019 |
| RU | 2627028 C2 | 8/2017 |
| WO | 2016181240 A1 | 11/2016 |

OTHER PUBLICATIONS

Notice of Allowance of the Chinese application No. 201780090648. 4, dated Nov. 25, 2020.
Written Opinion of the International Search Authority in the international application No. PCT/CN2017/101951, dated Jun. 8, 2018.
Supplementary European Search Report in the European application No. 17925383.6, dated Apr. 14, 2020.
First Office Action of the Chinese application No. 201780090848.4, dated Jun. 11, 2020.
Nokia et al: "Correction to UE apabilities" 3GPP Draft; 363310R3010 (REL-14) R2-1708673 UE CAP, 3rd Generation Partnership Project T(3GPP). Mobile Competence Centre; 650, Route 3 Deslucioles: F-06921 Sopha-Antipolis Cedex; France vol. RAN WG2, No. Berlin, Germany; Aug. 21, 2017-Aug. 25, 2017 Aug. 20, 2017 (Aug. 20, 2017), XP051317504, Retrieved from the Internet: URL: http://www.3gpp.org/ftp/Meetings_3GPP SYNC/RAN2/Docs/ [retrieved on Aug. 20, 2017] * p. 1 * * p. 38-p. 39 *.
CATT: "Miscenaneous corrections on VaX", 3GPP Draft; 36331 CR2981 (REL-14) R2-1708061-Miscellan eous Corrections on V2X. 3rd Generation Partnership Project (3GPP), Mobilecompetence Centre: 650, Route Des Lucioles: F-06921 Sophia-Anti Polis vol. RAN WG2. No. Berlin, Germany; Aug. 21, 2017-Aug. 20, 2017 (Aug. 20, 2017), XP051317478. Retrieved from the Internet: URL: http://www.3gpp.org/ftp/Meetings 3GPP SYNC/RAN2/Docs/ [retrieved on Aug. 20, 2017] * p. 1 * * p. 39-p. 43 *.
Qualcomm Incorporated; "LTE/NR UE capability dependency and coordination", 3GPP Draft R2-1707835. 3rd Generation Partnership Project (3GPP) Mobileoompetence Centre; 650, Route Des Lucioles: F-06921 Sophia-Anti Polis Cedex France vol. RAN WG2, No. Berlin. Germany; Aug. 21, 2017-Aug. 25, 2017 Aug. 20, 2017 (Aug. 20, 2017), XP051317779, Retrieved from the Internet: URL: http://www.3gpp.org/ftp/Meetings_3GPP SYNC/RANG/Docs/ [retrieved on Aug. 20, 2017] * the whole document *.
First Office Action of the European application No. 17925383.6, dated Jan. 22, 2021.
Notice of Allowance of the Russian application No. 2020101961, dated Nov. 12, 2020.
International Search Report in the international application No. PCT/CN2017/101951, dated Jun. 8, 2018.
Office Action of the Indian application No. 201917053773, dated May 17, 2021.
First Office Action of the Canadian application No. 3066679, dated May 26, 2021.
Written Opinion of the Singaporean application No. 11201912252V, dated Sep. 20, 2021.

* cited by examiner

METHOD FOR RESOURCE CONFIGURATION, TERMINAL DEVICE AND NETWORK DEVICE

RELATED APPLICATION

This application is an application under 35 U.S.C. 371 of International Application No. PCT/CN2017/101951 filed on Sep. 15, 2017, the entire contents of which are incorporated herein by reference.

TECHNICAL FIELD

The application relates to the field of communications, and more particularly to a method for resource configuration, a terminal device and a network device.

BACKGROUND

In Release-15 of the 3rd Generation Partnership Project (3GPP) protocol, a terminal device may support independent scheduling and transmission of services on each carrier but the types of the carriers are required to be the same. For example, a terminal device supporting Vehicle to Everything (V2X) may carry out independent scheduling and transmission on multiple ProSe Control 5 (PC5) carriers.

However, in 5th-Generation (5G) New Radio (NR), some terminal devices may need simultaneous transmission of aggregated data on an Uplink (UL) and a Sidelink (SL). Existing independent scheduling and transmission on carriers of a single type cannot meet a requirement on data transmission in 5G NR.

SUMMARY

Embodiments of the application provide methods for resource configuration, a terminal device and a network device, which may support aggregated data transmission of a terminal device on a mixed carrier (PC5 carrier resource+ Uu carrier resource) and a PC5 carrier, improving efficiency of data transmission in 5G NR and achieving higher flexibility of data transmission in 5G NR.

According to a first aspect, an embodiment of the application provides a method for resource configuration, which may include the following operations.

First information is transmitted to a network device, the first information including capability information, the capability information being for indicating a capability in simultaneous transmission and reception on multiple carriers, the multiple carriers including a first-type carrier and a second-type carrier, the first-type carrier being configured to transmit data on an SL and the second-type carrier being configured to transmit data on at least one of a UL, a Downlink (DL) and the SL.

Second information transmitted by the network device is received, the second information being for indicating a first transmission resource, allocated by the network device, for the first-type carrier and the second-type carrier and a valid time of the first transmission resource.

Optionally, the first-type carrier may be a PC5 carrier, and the second-type carrier may be a mixed carrier (PC5+Uu).

Accordingly, in the method for resource configuration of the embodiment of the application, a terminal device transmits the capability information to the network device to indicate that it has the capability in simultaneous transmission and reception on the multiple carriers (the first-type carrier and the second-type carrier), and the network device allocates the first transmission resource for the first-type carrier and the second-type carrier and the valid time of the first transmission resource, so that the terminal device may determine a resource for aggregated data transmission on the multiple carriers.

Furthermore, the network device may simultaneously schedule the resource for the first-type carrier and the second-type carrier and allocate the resource for the first-type carrier and the second-type carrier to the terminal device, and the terminal device may further achieve the purpose of aggregated data transmission on the first-type carrier and the second-type carrier, so that data transmission efficiency is further improved.

Optionally, in an implementation mode of the first aspect, the first information may further include request information, the request information being for requesting for aggregated data transmission on the multiple carriers.

Accordingly, in the method for resource configuration of the embodiment of the application, the terminal device may further transmit the request information to the network device to request for aggregated data transmission on the multiple carriers while transmitting the capability information to the network device, so that the network device may effectively allocate the resource to the terminal device.

Optionally, in an implementation mode of the first aspect, before the operation that the first information is transmitted to the network device, the method may further include the following operation.

Third information transmitted by the network device is received, the third information including first-type carrier information and the third information being for instructing the network device to allocate a resource for the first-type carrier.

Optionally, in an implementation mode of the first aspect, the third information may be system information or dedicated Radio Resource Control (RRC) signaling.

Optionally, in an implementation mode of the first aspect, the method may further include the following operations.

A second transmission resource is determined based on the first transmission resource.

Data is transmitted on the second transmission resource.

Optionally, in an implementation mode of the first aspect, the operation that the second transmission resource is determined based on the first transmission resource may include the following operation.

The second transmission resource is determined from the first transmission resource.

Accordingly, in the method for resource configuration of the embodiment of the application, the terminal device determines the second transmission resource transmitting the data in the first transmission resource allocated by the network device, so that the data transmission efficiency is improved.

Optionally, in an implementation mode of the first aspect, the operation that the second transmission resource is determined from the first transmission resource may include the following operation.

The second transmission resource is determined from the first transmission resource according to at least one of a Channel Busy Ratio (CBR), the capability in simultaneous transmission and reception on the multiple carriers, transmitting power and priority of a transmitted service.

Accordingly, in the method for resource configuration of the embodiment of the application, the terminal device, when determining the second transmission resource, simultaneously considers factors such as the CBR, the capability in simultaneous transmission and reception on the multiple carriers, the transmitting power and the priority of the transmitted service, so that the determined second transmission resource is more consistent with a practical requirement of the terminal device.

Optionally, in an implementation mode of the first aspect, the method may further include the following operation.

The data is transmitted on the second transmission resource within the valid time of the first transmission resource.

Optionally, in an implementation mode of the first aspect, the first transmission resource may be a semi-persistent scheduling resource and/or a shared resource pool.

Optionally, in an implementation mode of the first aspect, the method may further include the following operation.

Data is received on a third transmission resource, the third transmission resource being configured by the network device through system information and the third transmission resource including the first-type carrier.

Optionally, in an implementation mode of the first aspect, the method may further include the following operation.

The data is received on a fourth transmission resource, the fourth transmission resource being configured by the network device and the fourth transmission resource including the second-type carrier.

According to a second aspect, the embodiment of the application provides a method for resource configuration, which may include the following operations.

First information transmitted by a terminal device is received, the first information including capability information, the capability information being for indicating a capability of the terminal device in simultaneous transmission and reception on multiple carriers, the multiple carriers including a first-type carrier and a second-type carrier, the first-type carrier being configured to transmit data on an SL and the second-type carrier being configured to transmit data on at least one of a UL, a DL and the SL.

Second information is transmitted to the terminal device based on the first information, the second information being for indicating a first transmission resource, allocated by a network device, for the first-type carrier and the second-type carrier and a valid time of the first transmission resource.

Accordingly, in the method for resource configuration of the embodiments of the application, the terminal device transmits the capability information to the network device to indicate that it has the capability in simultaneous transmission and reception on the multiple carriers (the first-type carrier and the second-type carrier), and the network device allocates the first transmission resource for the first-type carrier and the second-type carrier and the valid time of the first transmission resource, so that the terminal device may determine a resource for aggregated data transmission on the multiple carriers.

Furthermore, the network device may simultaneously schedule the resource for the first-type carrier and the second-type carrier and allocate the resource for the first-type carrier and the second-type carrier to the terminal device, and the terminal device may further achieve the purpose of aggregated data transmission on the first-type carrier and the second-type carrier, so that data transmission efficiency is further improved.

Optionally, in an implementation mode of the second aspect, the first information may further include request information, the request information being for requesting for aggregated data transmission on the multiple carriers.

Accordingly, in the method for resource configuration of the embodiment of the application, the terminal device may further transmit the request information to the network device to request for aggregated data transmission on the multiple carriers while transmitting the capability information to the network device, so that the network device may effectively allocate the resource to the terminal device.

Optionally, in an implementation mode of the second aspect, before the operation that the first information transmitted by the terminal device is received, the method may further include the following operation.

Third information is transmitted to the terminal device, the third information including first-type carrier information and the third information being for instructing the network device to allocate a resource for the first-type carrier.

Optionally, in an implementation mode of the second aspect, the third information may be system information or dedicated RRC signaling.

Optionally, in an implementation mode of the second aspect, the first transmission resource may be a semi-persistent scheduling resource and/or a shared resource pool.

Optionally, in an implementation mode of the second aspect, fourth information may be transmitted to the terminal device, the fourth information being for indicating a third transmission resource, the third transmission resource being a resource for data reception of the terminal device and the third transmission resource including the first-type carrier.

Accordingly, in the method for resource configuration of the embodiment of the application, the network device may further allocate the resource for data reception of the first-type carrier to the terminal device.

According to a third aspect, an embodiment of the application provide a method for resource configuration, which may include the following operations.

First information is transmitted to a network device, the first information including capability information, the capability information being for indicating a capability in simultaneous transmission and reception on multiple carriers, the multiple carriers including a first-type carrier and a second-type carrier, the first-type carrier being configured to transmit data on an SL and the second-type carrier being configured to transmit data on at least one of a UL, a Downlink (DL) and the SL.

Second information transmitted by the network device is received, the second information being for indicating a first transmission resource, allocated by the network device, for the second-type carrier and a valid time of the first transmission resource.

Accordingly, in the method for resource configuration of the embodiment of the application, a terminal device transmits the capability information to the network device to indicate that it has the capability in simultaneous transmission and reception on the multiple carriers (the first-type carrier and the second-type carrier), and the network device allocates the first transmission resource for the second-type carrier and the valid time of the first transmission resource.

Furthermore, the network device may allocate the resource for the second-type carrier to the terminal device, and then the terminal device may determine a resource for the first-type carrier based on the resource for the second-type carrier, so that the terminal device may achieve the purpose of aggregated data transmission on the first-type carrier and the second-type carrier, and data transmission efficiency is further improved.

Optionally, in an implementation mode of the third aspect, the first information may further include request information, the request information being for requesting for aggregated data transmission on the multiple carriers.

Accordingly, in the method for resource configuration of the embodiment of the application, the terminal device may further transmit the request information to the network device to request for aggregated data transmission on the multiple carriers while transmitting the capability information to the network device, so that the network device may effectively allocate the resource to the terminal device.

Optionally, in an implementation mode of the third aspect, the method may further include the following operation.

A second transmission resource for the first-type carrier is determined based on the first transmission resource and a CBR on the first-type carrier.

Accordingly, in the method for resource configuration of the embodiment of the application, the terminal device may determine the second transmission resource for the first-type carrier based on the first transmission resource, allocated by the network device, for the second-type carrier and the CBR on the first-type carrier, so that the terminal device may determine a resource transmitting data in the first transmission resource and the second transmission resource, and furthermore, the terminal device may achieve the purpose of aggregated data transmission on the first-type carrier and the second-type carrier.

Optionally, in an implementation mode of the third aspect, the method may further include the following operations.

A third transmission resource is determined based on the first transmission resource and the second transmission resource.

Data is transmitted on the third transmission resource.

Optionally, in an implementation mode of the third aspect, the operation that the third transmission resource is determined based on the first transmission resource and the second transmission resource may include the following operation.

The third transmission resource is determined from the first transmission resource and/or the second transmission resource.

Optionally, in an implementation mode of the third aspect, the operation that the third transmission resource is determined from the first transmission resource and/or the second transmission resource may include the following operation.

The third transmission resource is determined from the first transmission resource and/or the second transmission resource according to at least one of a CBR, the capability in simultaneous transmission and reception on the multiple carriers, transmitting power and priority of a transmitted service.

Optionally, in an implementation mode of the third aspect, upon when the transmitting power is larger than or equal to preset power, multiple carriers in the third transmission resource may overlap in a time domain, and/or upon when the transmitting power is lower than the preset power, the multiple carriers in the third transmission resource may not overlap in the time domain.

Optionally, in an implementation mode of the third aspect, the method may further include the following operation.

The data is transmitted on the third transmission resource within the valid time of the first resource.

Optionally, in an implementation mode of the third aspect, the first transmission resource may be a semi-persistent scheduling resource and/or a shared resource pool.

Optionally, in an implementation mode of the third aspect, the method may further include the following operation.

Data is received on a fourth transmission resource, the fourth transmission resource being configured by the network device and the fourth transmission resource including the second-type carrier.

According to a fourth aspect, an embodiment of the application provide a method for resource configuration, which may include the following operations.

First information transmitted by a terminal device is received, the first information including capability information, the capability information being for indicating a capability in simultaneous transmission and reception on multiple carriers, the multiple carriers including a first-type carrier and a second-type carrier, the first-type carrier being configured to transmit data on an SL and the second-type carrier being configured to transmit data on at least one of a UL, a DL and the SL.

Second information is transmitted to the terminal device based on the first information, the second information being for indicating a first transmission resource, allocated by a network device, for the second-type carrier and a valid time of the first transmission resource.

Accordingly, in the method for resource configuration of the embodiment of the application, the terminal device transmits the capability information to the network device to indicate that it has the capability in simultaneous transmission and reception on the multiple carriers (the first-type carrier and the second-type carrier), and the network device allocates the first transmission resource for the second-type carrier and the valid time of the first transmission resource.

Furthermore, the network device may allocate the resource for the second-type carrier to the terminal device, and then the terminal device may determine a resource for the first-type carrier based on the resource for the second-type carrier, so that the terminal device may determine a resource for aggregated data transmission on the multiple carriers, and data transmission efficiency is further improved.

Optionally, in an implementation mode of the fourth aspect, the first information may further include request information, the request information being for requesting for aggregated data transmission on the multiple carriers.

Optionally, in an implementation mode of the fourth aspect, the first transmission resource may be a semi-persistent scheduling resource and/or a shared resource pool.

Optionally, in an implementation mode of the fourth aspect, the method may further include the following operation.

Third information is transmitted to the terminal device, the third information being for indicating a second transmission resource, the second transmission resource being a resource for data reception of the terminal device and the second transmission resource including the second-type carrier.

According to a fifth aspect, an embodiment of the application provides a method for resource configuration, which may include the following operations.

First information transmitted by a network device is received, the first information being for indicating a first transmission resource, allocated by the network device, for multiple carriers and a valid time of the first transmission resource, the multiple carriers including a first-type carrier and a second-type carrier, the first-type carrier being configured to transmit data on an SL, the second-type carrier being configured to transmit data on at least one of a UL, a DL and the SL and the first transmission resource being a shared resource pool.

A second transmission resource is determined based on the first transmission resource.

Data is transmitted on the second transmission resource.

Accordingly, in the method for resource configuration of the embodiment of the application, the network device may directly indicate the first transmission resource for the first-type carrier and the second-type carrier, and then the terminal device may determine the second transmission resource transmitting the data based on the first transmission resource and may further achieve the purpose of aggregated transmission on the first-type carrier and the second-type carrier, so that data transmission efficiency is improved.

Optionally, in an implementation mode of the fifth aspect, the operation that the second transmission resource is determined based on the first transmission resource may include the following operation.

The second transmission resource is determined from the first transmission resource.

Optionally, in an implementation mode of the fifth aspect, the first information may be system information or dedicated RRC signaling.

Optionally, in an implementation mode of the fifth aspect, the method may further include the following operations.

A third transmission resource is determined from the first transmission resource.

Data is received on the third transmission resource.

According to a sixth aspect, an embodiment of the application provides a method for resource configuration, which may include the following operation.

First information is transmitted to a terminal device, the first information being for indicating a first transmission resource, allocated to the terminal device, for multiple carriers and a valid time of the first transmission resource, the multiple carriers including a first-type carrier and a second-type carrier, the first-type carrier being configured to transmit data on an SL, the second-type carrier being configured to transmit data on at least one of a UL, a DL and the SL and the first transmission resource being a shared resource pool.

Accordingly, in the method for resource configuration of the embodiments of the application, a network device may directly indicate the first transmission resource for the first-type carrier and the second-type carrier, and then the terminal device may determine a second transmission resource for transmitting data based on the first transmission resource and may further achieve the purpose of aggregated transmission on the first-type carrier and the second-type carrier, so that data transmission efficiency is improved.

Optionally, in an implementation mode of the sixth aspect, the first information may be system information or dedicated RRC signaling.

According to a seventh aspect, an embodiment of the application provides a terminal device, which may include modules or units executing the method in the first aspect or any optional implementation mode of the first aspect.

According to an eighth aspect, an embodiment of the application provides a network device, which may include modules or units executing the method in the second aspect or any optional implementation mode of the second aspect.

According to a ninth aspect, an embodiment of the application provides a terminal device, which may include modules or units executing the method in the third aspect or any optional implementation mode of the third aspect.

According to a tenth aspect, an embodiment of the application provides a network device, which may include modules or units executing the method in the fourth aspect or any optional implementation mode of the fourth aspect.

According to an eleventh aspect, an embodiment of the application provides a terminal device, which may include modules or units executing the method in the fifth aspect or any optional implementation mode of the fifth aspect.

According to a twelfth aspect, an embodiment of the application provides a network device, which may include modules or units executing the method in the sixth aspect or any optional implementation mode of the sixth aspect.

A thirteenth aspect provides a terminal device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the first aspect or any possible implementation mode of the first aspect.

A fourteenth aspect provides a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the second aspect or any possible implementation mode of the second aspect.

A fifteenth aspect provides a terminal device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the third aspect or any possible implementation mode of the third aspect.

A sixteenth aspect provides a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the fourth aspect or any possible implementation mode of the fourth aspect.

A seventeenth aspect provides a terminal device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the fifth aspect or any possible implementation mode of the fifth aspect.

An eighteenth aspect provides a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the sixth aspect or any possible implementation mode of the sixth aspect.

A nineteenth aspect provides a computer storage medium, in which a program code is stored, the program code including an instruction configured to instruct a computer to execute the method in the first aspect or any possible implementation mode of the first aspect.

A twentieth aspect provides a computer storage medium, in which a program code is stored, the program code including an instruction configured to instruct a computer to execute the method in the second aspect or any possible implementation mode of the second aspect.

A twenty-first aspect provides a computer storage medium, in which a program code is stored, the program code including an instruction configured to instruct a computer to execute the method in the third aspect or any possible implementation mode of the third aspect.

A twenty-second aspect provides a computer storage medium, in which a program code is stored, the program code including an instruction configured to instruct a computer to execute the method in the fourth aspect or any possible implementation mode of the fourth aspect.

A twenty-third aspect provides a computer storage medium, in which a program code is stored, the program code including an instruction configured to instruct a computer to execute the method in the fifth aspect or any possible implementation mode of the fifth aspect.

A twenty-fourth aspect provides a computer storage medium, in which a program code is stored, the program code including an instruction configured to instruct a computer to execute the method in the sixth aspect or any possible implementation mode of the sixth aspect.

A twenty-fifth aspect provides a computer program product including an instruction, which runs in a computer to enable the computer to execute the method in each aspect.

DETAILED DESCRIPTION

The technical solutions in the embodiments of the application will be clearly and completely described below in combination with the drawings in the embodiments of the application.

The technical solutions of the embodiments of the application may be applied to various communication systems, for example, a Long Term Evolution (LTE) system, an LTE Frequency Division Duplex (FDD) system, LTE Time Division Duplex (TDD), a Universal Mobile Telecommunication System (UMTS) or a future 5G system.

It is to be understood that the technical solutions of the embodiments of the application may be applied to an Internet of vehicles system. The Internet of vehicles system may implement Device to Device (D2D) communication based on various communication systems, for example, an LTE-D2D-based Internet of vehicles system. Unlike a manner of receiving or transmitting communication data between terminals in a conventional LTE system through a network device (for example, a base station), D2D communication may be adopted for the Internet of vehicles system, and thus higher spectral efficiency and a shorter transmission delay are ensured.

D2D communication may refer to Vehicle to Vehicle (V2V) communication or V2X communication. In V2X communication, X may generally refer to any device with a capability of wireless reception and transmission, including but not limited to, a wireless device moving at a low speed, a vehicle device moving at a high speed or a network control node with a capability of wireless reception and transmission, etc. It is to be understood that the embodiments of the application are mainly applied to a V2X communication scenario but may also be applied to any other D2D communication scenarios. There are no limits made thereto in the embodiments of the application.

A terminal device in the embodiments of the application may refer to a vehicle terminal device, and may also refer to other devices communicating with the vehicle terminal device, for example, a terminal device in a future 5G network or a terminal device in a future evolved Public Land Mobile Network (PLMN). There are no limits made in the embodiments of the application.

Each embodiment of the application is described in combination with a network device. The network device in the embodiments of the application may be a device configured to communicate with the terminal device. The network device may be an Evolutional Node B (eNB or eNodeB) in the LTE system and may also be a wireless controller in a Cloud Radio Access Network (CRAN) scenario. Or the network device may be a relay station, an access point, a vehicle device, a wearable device, a network device (for example, gNB) in the future 5G network, a network device in the future evolved PLMN or the like. There are no limits made in the embodiments of the application.

Figure 1:
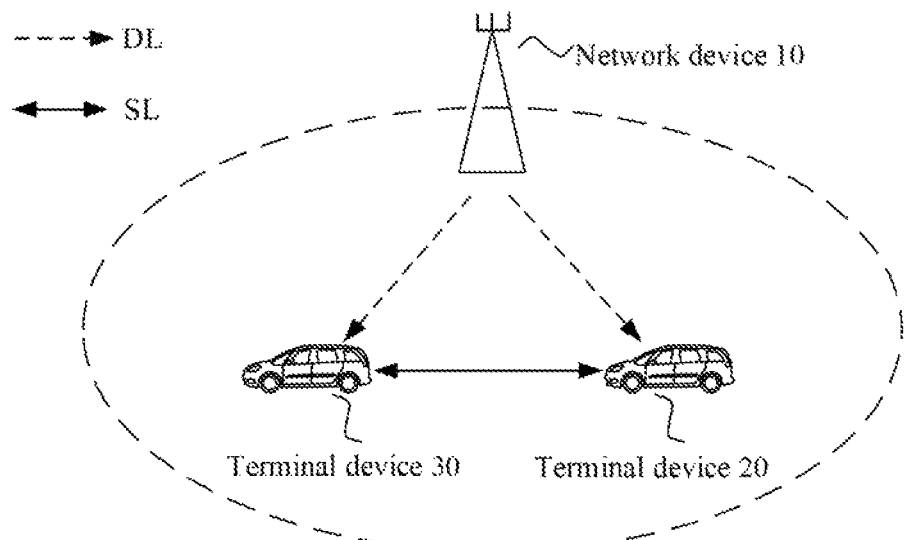
FIG. 1 is a schematic diagram of an application scenario according to an embodiment of the application.
Figure 2:
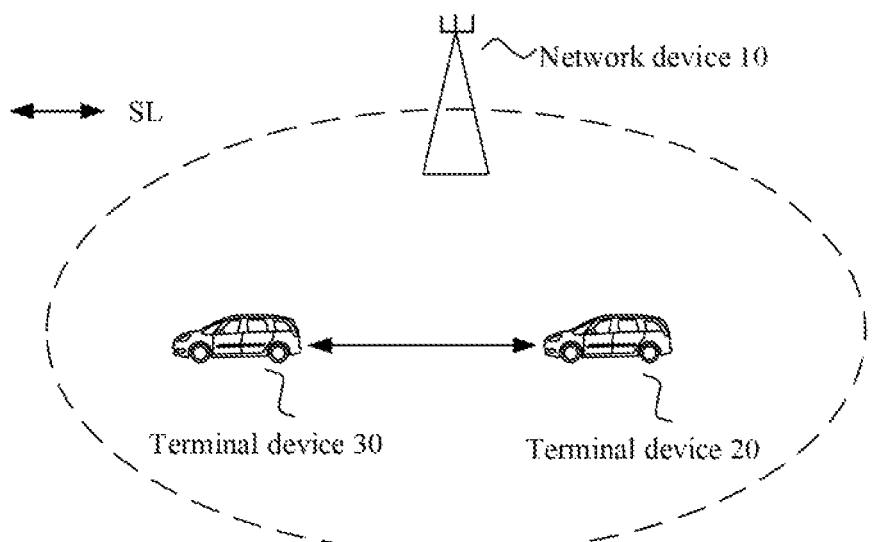
FIG. 2 is a schematic diagram of another application scenario according to an embodiment of the application.

FIG. 1 and FIG. 2 are schematic diagrams of an application scenario based on embodiments of the application. A network device and two terminal devices are exemplarily shown in FIG. 1. Optionally, a wireless communication system in the embodiment of the application may include multiple network devices and there may be other number of terminal devices than the example two terminal devices in coverage of each network device. There are no limits made thereto in the embodiment of the application. In addition, the wireless communication system may further include other network entities such as a Mobile Management Entity (MME), a Serving Gateway (S-GW) and a Packet data Network Gateway (P-GW). However, the embodiments of the application are not limited thereto.

Specifically, the terminal device 20 (for example, a vehicle terminal) may communicate with the terminal device 30 (another terminal) through a D2D communication. During the D2D communication, the terminal device 20 may directly communicate with the terminal device 30 through a D2D link, i.e., an SL. For example, as shown in FIG. 1 or FIG. 2, the terminal device 20 directly communicates with the terminal device 30 through the SL. In FIG. 1, the terminal device 20 communicates with the terminal device 30 through the SL, and a transmission resource (for example, a carrier) is allocated by the network device. In FIG. 2, the terminal device 20 communicates with the terminal device 30 through the SL, a transmission resource is selected independently by the terminal device (for example, the terminal device may select an available carrier from a resource pool which is pre-configured), without need of being allocated by the network device.

Figures 3, 4:
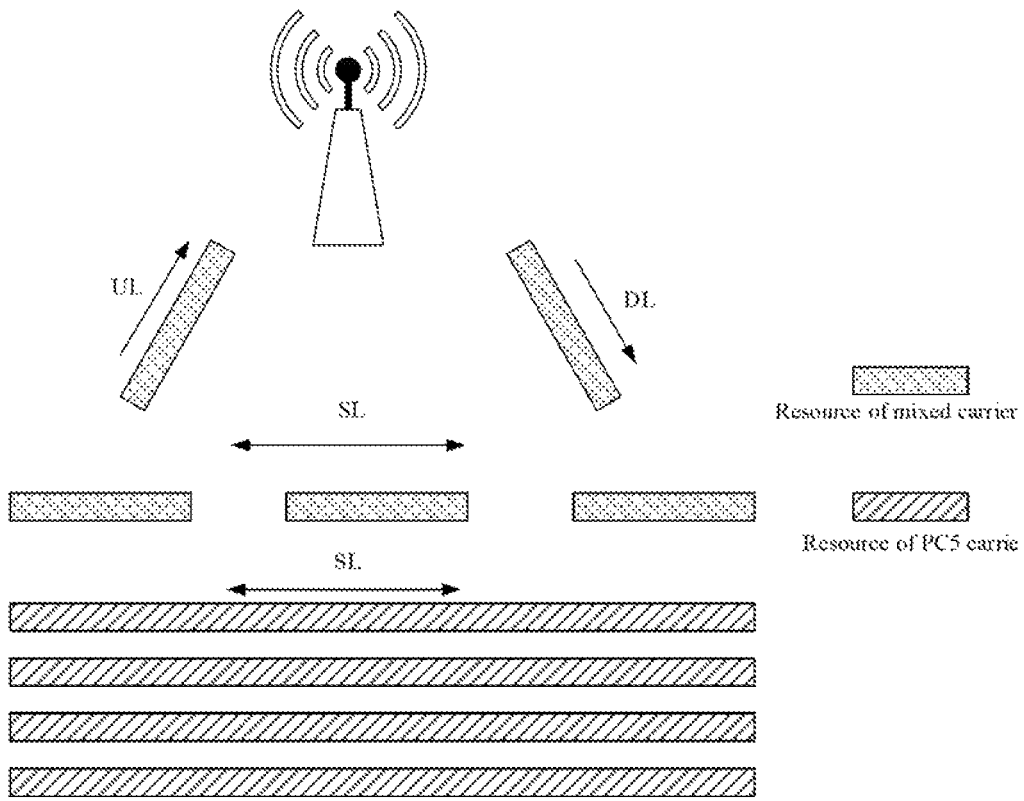
FIG. 3 is a schematic diagram of aggregated data transmission according to an embodiment of the application.
FIG. 4 is a schematic flowchart of a method for resource configuration according to an embodiment of the application.

As shown in FIG. 3, a terminal device may implement aggregated data transmission on a mixed carrier and a PC5 carrier. The terminal device may transmit, on the mixed carrier, data on at least one of a UL, a DL and an SL, and a transmission resource on the mixed carrier is allocated by a network device (for example, a base station). The terminal device may transmit the data on the SL on the PC5 carrier, and a transmission resource on the PC5 carrier may be allocated by the network device (for example, the base station) or may also be selected by the terminal device from a pre-configured resource pool.

Optionally, the terminal device may simultaneously transmit the data on resources of the PC5 carrier and a Uu carrier through the mixed carrier.

In addition, each aspect or characteristic of the application may be implemented as a method, a device or a product programmed with a standard and/or using an engineering technology. Terminology "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Terminology "machine-readable medium" may include, but not limited to, various media capable of storing, containing and/or carrying instructions and/or data.

It is to be understood that terminologies "system" and "network" in the disclosure may usually be exchanged in the disclosure. In the disclosure, terminology "and/or" is only an association relationship describing associated objects only and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 4 is a schematic flowchart of a method 200 for resource configuration according to an embodiment of the application. As shown in FIG. 4, the method 200 may be executed by a terminal device. The terminal device may be the terminal device shown in FIG. 1 or FIG. 2, and the terminal device may implement aggregated data transmission on a mixed carrier and a PC5 carrier, as shown in FIG. 3. A network device in the method 200 may be the network device shown in FIG. 1. The method 200 includes the following operations.

In the operation 210, first information is transmitted to the network device; the first information may include capability information which is configured to indicate a capability in simultaneous transmission and reception on multiple carriers; the multiple carriers may include a first-type carrier and a second-type carrier, the first-type carrier being configured to transmit data on an SL and the second-type carrier being configured to transmit data on at least one of a UL, a DL and the SL.

Optionally, transmission of the capability information from the terminal device may indicate that the terminal device may transmit data on the first-type carrier and the second-type carrier, namely the terminal device may support a V2X service and may also support a UL/DL service with the network device.

Optionally, the terminal device may report the capability information to the network device before data transmission, so that the network device can allocate a resource to the terminal device more reasonably during resource allocation.

Optionally, the first-type carrier may be a PC5 carrier, the second-type carrier may be a mixed carrier, and the mixed carrier may include resources on both the PC5 carrier and a Uu carrier, namely the mixed carrier may be configured to transmit the data on at least one of the UL, the DL and the SL.

Optionally, the first information may further include request information, the request information is configured to request for aggregated data transmission on the multiple carriers. Optionally, transmission of the request information from the terminal device may indicate that the terminal device needs use of resources on the multiple carriers.

Optionally, the terminal device, when needing to implement aggregated data transmission on the multiple carriers, may transmit the request information to the network device.

Optionally, the terminal device, upon that when powered on to access a network, may transmit both the capability information and the request information to the network device.

In the operation 220, second information transmitted by the network device is received, the second information being for indicating a first transmission resource, allocated by the network device, for the first-type carrier and the second-type carrier and for indicating a valid time of the first transmission resource.

Optionally, the network device may allocate the first transmission resource for the first-type carrier and the second-type carrier and the valid time of the first transmission resource to the terminal device after acquiring the capability information from the terminal device.

Optionally, the network device may allocate the first transmission resource for the first-type carrier and the second-type carrier and the valid time of the first transmission resource to the terminal device after acquiring the capability information and request information from the terminal device.

Optionally, the first transmission resource is a semi-persistent scheduling resource and/or a shared resource pool.

Optionally, the terminal device, upon when needing to transmit data, may directly use the semi-persistent scheduling resource for itself without need of requesting the network device again.

Optionally, upon that the first transmission resource is the shared resource pool, the network device may further configure time-domain information of the shared resource pool, i.e., a valid time of the shared resource pool, and the terminal device may use a resource of the shared resource pool only within the valid time of the shared resource pool.

Optionally, allocation of the first transmission resource for the first-type carrier and the second-type carrier by the network device may indicate that the network device simultaneously controls resources on the first-type carrier and the second-type carrier.

Optionally, before the operation that the first information is transmitted to the network device, the method may further include the following operation that:

third information transmitted from the network device is received, the third information including first-type carrier information and being for instructing the network device to allocate a resource for the first-type carrier.

Optionally, transmission of the third information by the network device may indicate that the network device has a capability of allocating the resource for the first-type carrier, namely the network device controls the resource for the first-type carrier.

Optionally, the network device may be pre-configured with a capability of allocating a resource for the second-type carrier.

Optionally, the third information may be system information or dedicated RRC signaling.

Optionally, the method 200 may further include the following operations that:

a second transmission resource is determined based on the first transmission resource; and data is transmitted on the second transmission resource.

Optionally, on the second transmission resource, the terminal device may transmit the data on the UL, or may transmit the data on the SL, or may simultaneously transmit the data on the UL and the SL.

Optionally, the data on the SL may be V2X service data.

Optionally, the second transmission resource may be determined from the first transmission resource.

Optionally, the second transmission resource may be part or all of the first transmission resource allocated by the network device.

Optionally, the terminal device may determine the second transmission resource from the first transmission resource according to at least one of a Channel Busy Ratio (CBR), the capability in simultaneous transmission and reception on multiple carriers, transmitting power and priority of a transmitted service.

Optionally, the second transmission resource may be determined from the first transmission resource with reference to a CBR of each of the multiple carriers.

Optionally, upon that when the transmitting power is high enough, the terminal device may simultaneously transmit the data on the UL and the SL.

Optionally, upon that when the transmitting power is not so high, the terminal device may transmit the data on the UL and the SL concurrently, but staggered in a time domain.

Optionally, the data may be transmitted on the second transmission resource within the valid time of the first transmission resource.

Optionally, upon that when the first transmission resource is the shared resource pool, the terminal device may transmit the data on the second transmission resource within the valid time of the first transmission resource.

Optionally, upon that when the first transmission resource is the semi-persistent scheduling resource, the terminal device may need to consider whether the semi-persistent scheduling resource has been released or not before transmitting the data on the second transmission resource.

Optionally, the method 200 may further include the following operation that:

data is received on a third transmission resource, the third transmission resource being configured by the network device through system information and the third transmission resource including the first-type carrier.

Optionally, the third transmission resource may be larger than the first transmission resource configured by the network device for data transmission, namely the resource occupied by the terminal device for data reception is larger.

Optionally, the method 200 may further include the following operation that:

the data is received on a fourth transmission resource, the fourth transmission resource being configured by the network device and including the second-type carrier.

Optionally, the fourth transmission resource may be larger than the first transmission resource configured by the network device for data transmission, namely the resource occupied by the terminal device for data reception is larger.

Accordingly, in the embodiments of the method for resource configuration of the application, the terminal device transmits the capability information to the network device to indicate that it has the capability in simultaneous transmission and reception on the multiple carriers (the first-type carrier and the second-type carrier), and the network device allocates the first transmission resource for the first-type carrier and the second-type carrier and the valid time of the first transmission resource, so that the terminal device may determine a resource for aggregated data transmission on the multiple carriers.

Furthermore, the network device may simultaneously schedule the resource for the first-type carrier and the second-type carrier and allocate the resource for the first-type carrier and the second-type carrier to the terminal device, and the terminal device may further achieve aggregated data transmission on both the first-type carrier and the second-type carrier, so that data transmission efficiency is further improved.

Figure 5:
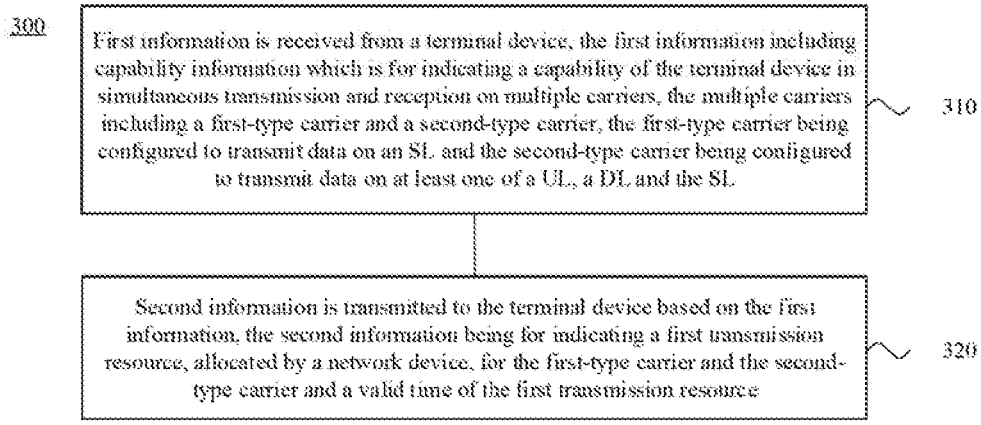
FIG. 5 is a schematic flowchart of another method for resource configuration according to an embodiment of the application.

FIG. 5 is a schematic flowchart of a method for resource configuration 300 according to an embodiment of the application. As shown in FIG. 5, the method 300 may be executed by a network device. The network device may be the network device shown in FIG. 1, and the network device may allocate a resource for aggregated data transmission on both a mixed carrier and a PC5 carrier to a terminal device, as shown in FIG. 3. The terminal device in the method 300 may be the terminal device shown in FIG. 1 or FIG. 2. The method 300 includes the following operations.

In the operation 310, first information transmitted from the terminal device is received; the first information may include capability information which is for indicating a capability of the terminal device in simultaneous transmission and reception on multiple carriers; the multiple carriers may include a first-type carrier and a second-type carrier, the first-type carrier being configured to transmit data on an SL and the second-type carrier being configured to transmit data on at least one of a UL, a DL and the SL.

Optionally, the first transmission resource may be a semi-persistent scheduling resource and/or a shared resource pool.

Optionally, the first information may further include request information, the request information being for requesting for aggregated data transmission on the multiple carriers.

Optionally, before the operation that the first information transmitted from the terminal device is received, the method may further includes the following operation:

third information is transmitted to the terminal device, the third information including first-type carrier information and being for instructing the network device to allocate a resource for the first-type carrier.

Optionally, the third information may be system information or dedicated RRC signaling.

In the operation 320, second information is transmitted to the terminal device based on the first information; the second information may be for indicating a first transmission resource, allocated by the network device, for the first-type carrier and the second-type carrier and a valid time of the first transmission resource.

Optionally, the network device may control a transmission resource for the first-type carrier.

Optionally, it may be pre-configured that the network device controls a transmission resource for the second-type carrier.

Optionally, fourth information may be transmitted to the terminal device, the fourth information being for indicating a third transmission resource, the third transmission resource being a resource for data reception of the terminal device and including the first-type carrier.

It is to be understood that the operations in the method 300 for resource configuration may refer to descriptions about the corresponding operations in the method 200 for resource configuration and, for simplicity, will not be elaborated herein.

Accordingly, in the method for resource configuration of the embodiment of the application, the terminal device transmits the capability information to the network device to indicate that it has the capability in simultaneous transmission and reception on the multiple carriers (the first-type carrier and the second-type carrier), and the network device allocates the first transmission resource for the first-type carrier and the second-type carrier and the valid time of the first transmission resource, so that the terminal device may determine a resource for aggregated data transmission on the multiple carriers.

Furthermore, the network device may simultaneously schedule a resource for both the first-type carrier and the second-type carrier and allocate the resource for both the first-type carrier and the second-type carrier to the terminal device, and the terminal device may further achieve the purpose of aggregated data transmission on the first-type carrier and the second-type carrier, so that data transmission efficiency is further improved.

Figure 6:
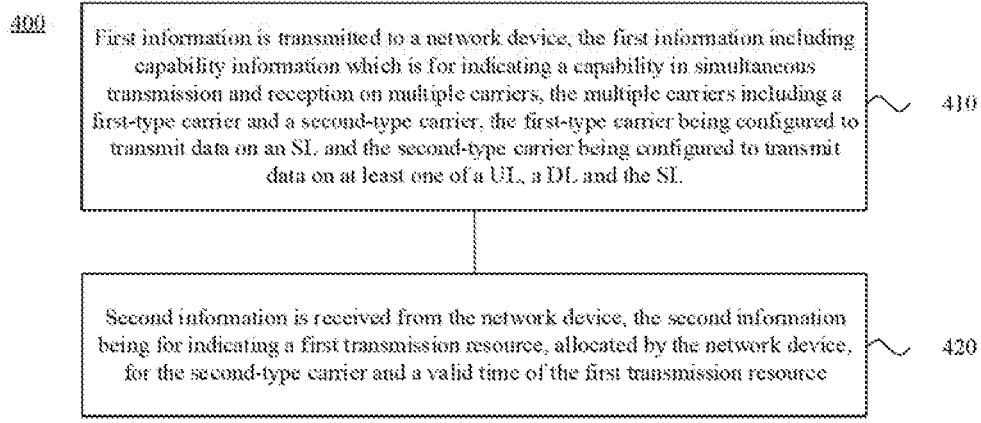
FIG. 6 is a schematic flowchart of yet another method for resource configuration according to an embodiment of the application.

FIG. 6 is a schematic flowchart of a method 400 for resource configuration according to an embodiment of the application. As shown in FIG. 6, the method 400 may be executed by a terminal device. The terminal device may be the terminal device shown in FIG. 1 or FIG. 2, and the terminal device may implement aggregated data transmission on both a mixed carrier and a PC5 carrier, as shown in FIG. 3. A network device in the method 400 may be the network device shown in FIG. 1. The method 400 includes the following operations.

In the operation 410, first information is transmitted to the network device; the first information may include capability information, the capability information being for indicating a capability in simultaneous transmission and reception on multiple carriers; the multiple carriers may include a first-type carrier and a second-type carrier, the first-type carrier being configured to transmit data on an SL and the second-type carrier being configured to transmit data on at least one of a UL, a DL and the SL.

Optionally, the first information may further include request information, the request information being for requesting for aggregated data transmission on the multiple carriers.

Optionally, the first transmission resource may be a semi-persistent scheduling resource and/or a shared resource pool.

In the operation 420, second information transmitted from the network device is received, the second information being for indicating a first transmission resource, allocated by the network device, for the second-type carrier and for indicating a valid time of the first transmission resource.

Optionally, the network device may not control a transmission resource for the first-type carrier.

Optionally, it may be pre-configured that the network device controls the transmission resource for the second-type carrier.

Optionally, the terminal device may control the transmission resource for the first-type carrier based on the pre-configured shared resource pool.

Optionally, the terminal device may determine a second transmission resource for the first-type carrier based on the first transmission resource and a CBR on the first-type carrier.

Optionally, the method 400 may further include the following operations that:

a third transmission resource is determined by the terminal device based on the first transmission resource and the second transmission resource; and data is transmitted on the third transmission resource.

Optionally, the terminal device may determine the third transmission resource from the first transmission resource and/or the second transmission resource.

Optionally, part of the third transmission resource for data transmission of the terminal device may be acquired from the first transmission resource allocated by the network device and the other part may be acquired from the second transmission resource allocated by the terminal device.

Optionally, the third transmission resource may be determined from the first transmission resource and/or the second transmission resource according to at least one of a CBR, the capability in simultaneous transmission and reception on the multiple carriers, transmitting power and priority of a transmitted service.

Optionally, if the transmitting power is larger than or equal to preset power, multiple carriers in the third transmission resource overlap in a time domain, and/or if the transmitting power is lower than the preset power, the multiple carriers in the third transmission resource do not overlap in the time domain.

Optionally, the method 400 may further include the following operation that:

the data is transmitted on the third transmission resource within the valid time of the first resource.

Optionally, the method 400 may further include the following operation that:

data is received on a fourth transmission resource, the fourth transmission resource being configured by the network device and including the second-type carrier.

It is to be understood that the operations in the method 400 for resource configuration may refer to descriptions about the corresponding operations in the method 200 for resource configuration and, for simplicity, will not be elaborated herein.

Accordingly, in the method for resource configuration of the embodiment of the application, the terminal device transmits the capability information to the network device to indicate that it has the capability in simultaneous transmission and reception on the multiple carriers (the first-type carrier and the second-type carrier), and the network device allocates the first transmission resource for the second-type carrier and the valid time of the first transmission resource.

Furthermore, the network device may allocate the resource for the second-type carrier to the terminal device, and then the terminal device may determine a resource for the first-type carrier based on the resource for the second-type carrier, so that the terminal device may achieve the purpose of aggregated data transmission on the first-type carrier and the second-type carrier, and data transmission efficiency is further improved.

Figure 7:
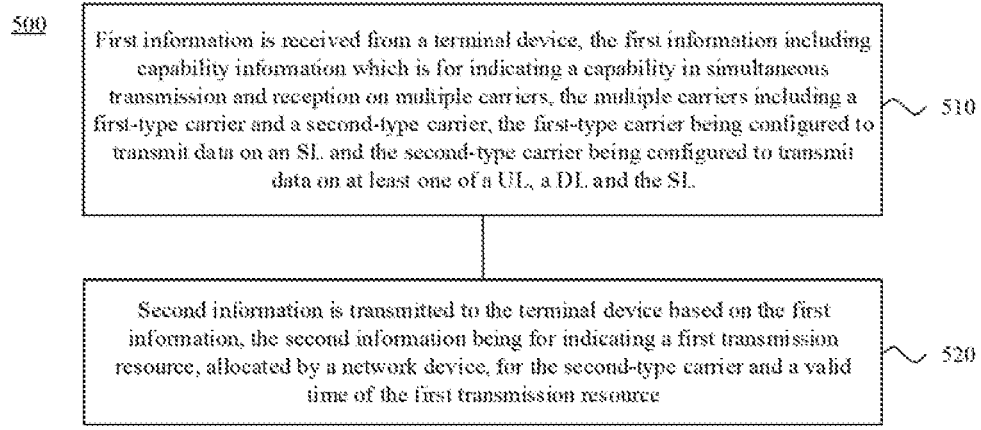
FIG. 7 is a schematic flowchart of yet another method for resource configuration according to an embodiment of the application.

FIG. 7 is a schematic flowchart of a method 500 for resource configuration according to an embodiment of the application. As shown in FIG. 7, the method 500 may be executed by a network device. The network device may be the network device shown in FIG. 1, and the network device may allocate a resource for aggregated data transmission on both a mixed carrier and a PC5 carrier to a terminal device, as shown in FIG. 3. The terminal device in the method 500 may be the terminal device shown in FIG. 1 or FIG. 2. The method 500 includes the following operations.

In the operation 510, first information transmitted by the terminal device is received; the first information may include capability information for indicating a capability in simultaneous transmission and reception on multiple carriers; the multiple carriers may include a first-type carrier and a second-type carrier, the first-type carrier being configured to transmit data on an SL and the second-type carrier being configured to transmit data on at least one of a UL, a DL and the SL.

Optionally, the first information may further include request information, the request information being used for requesting for aggregated data transmission on the multiple carriers.

Optionally, the first transmission resource may be a semi-persistent scheduling resource and/or a shared resource pool.

In the operation 520, second information is transmitted to the terminal device based on the first information, the second information being for indicating a first transmission resource, allocated by a network device, for the second-type carrier and a valid time of the first transmission resource.

Optionally, the network device may not control a transmission resource for the first-type carrier.

Optionally, it may be pre-configured that the network device controls the transmission resource for the second-type carrier.

Optionally, the terminal device may control the transmission resource for the first-type carrier based on the pre-configured shared resource pool.

Optionally, the method may further include the following operation that:

third information is transmitted to the terminal device, the third information being used to indicate a second transmission resource, the second transmission resource being a resource for data reception of the terminal device and the second transmission resource including the second-type carrier.

It is to be understood that the operations in the method 500 for resource configuration may refer to descriptions about the corresponding operations in the method 200 for resource configuration and, for simplicity, will not be elaborated herein.

Accordingly, in the method for resource configuration of the embodiment of the application, the terminal device transmits the capability information to the network device to indicate that it has the capability in simultaneous transmission and reception on the multiple carriers (the first-type carrier and the second-type carrier), and the network device allocates the first transmission resource for the second-type carrier and the valid time of the first transmission resource.

Furthermore, the network device may allocate the resource for the second-type carrier to the terminal device, and then the terminal device may determine a resource for the first-type carrier based on the resource for the second-type carrier, so that the terminal device may determine a resource for aggregated data transmission on the multiple carriers, and data transmission efficiency is further improved.

Figure 8:
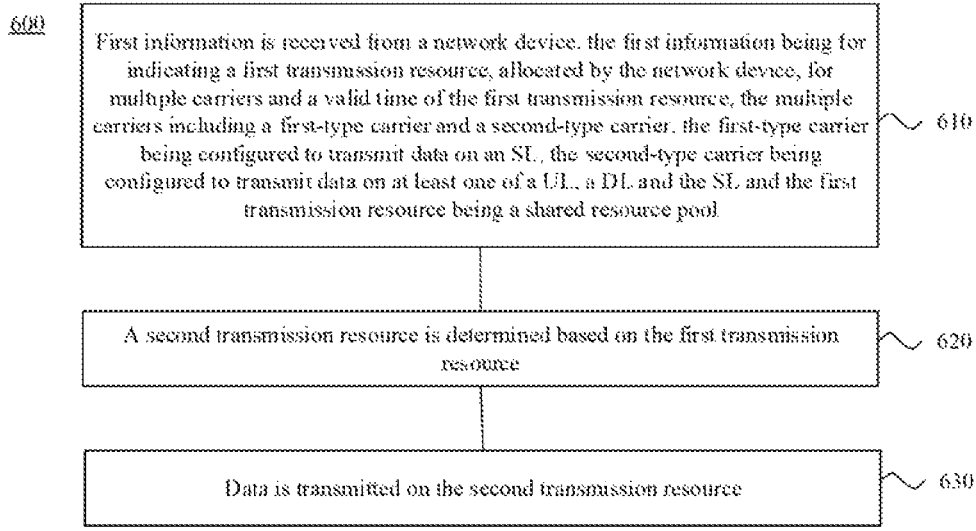
FIG. 8 is a schematic flowchart of yet another method for resource configuration according to an embodiment of the application.

FIG. 8 is a schematic flowchart of a method 600 for resource configuration according to an embodiment of the application. As shown in FIG. 8, the method 600 may be executed by a terminal device. The terminal device may be the terminal device shown in FIG. 1 or FIG. 2, and the terminal device may implement aggregated data transmission on a mixed carrier and a PC5 carrier, as shown in FIG. 3. A network device in the method 600 may be the network device shown in FIG. 1. The method 600 includes the following operations.

In the operation 610, first information transmitted from the network device is received: the first information may be for indicating a first transmission resource, allocated by the network device, for multiple carriers and for indicating a valid time of the first transmission resource; the multiple carriers may include a first-type carrier and a second-type carrier, the first-type carrier being configured to transmit data on an SL, the second-type carrier being configured to transmit data on at least one of a UL, a DL and the SL and the first transmission resource being a shared resource pool.

Optionally, the network device may control a transmission resource for the first-type carrier.

Optionally, the network device may be pre-configured to control a transmission resource for the second-type carrier.

Optionally, the first information may be system information.

Optionally, the network device may allocate the first transmission resource for the first-type carrier and the second-type carrier to the terminal without any request from the terminal device.

In the operation 620, a second transmission resource is determined based on the first transmission resource.

Optionally, the terminal device may determine the second transmission resource from the first transmission resource.

Optionally, the first information may be system information or dedicated RRC signaling.

In the operation 630, data may be transmitted on the second transmission resource.

Optionally, the method may further include the following operations That:

a third transmission resource is determined from the first transmission resource; and data is received on the third transmission resource.

It is to be understood that the operations in the method 600 for resource configuration may refer to descriptions about the corresponding operations in the method 200 for resource configuration and, for simplicity, will not be elaborated herein.

Accordingly, in the method for resource configuration of the embodiment of the application, the network device may directly indicate the first transmission resource for the first-type carrier and the second-type carrier, and then the terminal device may determine a second transmission resource for transmitting data based on the first transmission resource and may further achieve the purpose of aggregated transmission on the first-type carrier and the second-type carrier, so that data transmission efficiency is improved.

Figure 9:
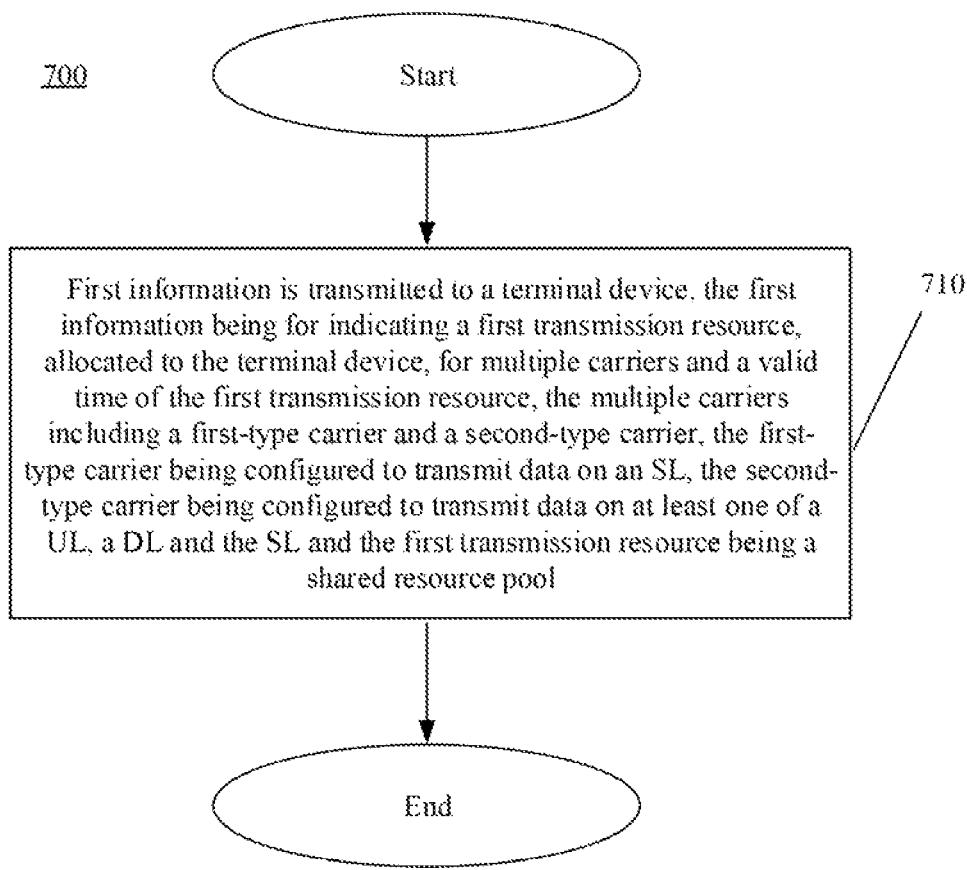
FIG. 9 is a schematic flowchart of still another method for resource configuration according to an embodiment of the application.

FIG. 9 is a schematic flowchart of a method 700 for resource configuration according to an embodiment of the application. As shown in FIG. 9, the method 700 may be executed by a network device. The network device may be the network device shown in FIG. 1, and the network device may allocate a resource for aggregated data transmission on both a mixed carrier and a PC5 carrier to a terminal device, as shown in FIG. 3. The terminal device in the method 700 may be the terminal device shown in FIG. 1 or FIG. 2. The method 700 includes the following operations.

In the operation 710, first information is transmitted to the terminal device; the first information may be used to indicate a first transmission resource, allocated to the terminal device, for multiple carriers and to indicate a valid time of the first transmission resource; the multiple carriers may include a first-type carrier and a second-type carrier, the first-type carrier being configured to transmit data on an SL, the second-type carrier being configured to transmit data on at least one of a UL, a DL and the SL and the first transmission resource being a shared resource pool.

Optionally, the network device may control a transmission resource for the first-type carrier.

Optionally, it may be pre-configured that the network device controls a transmission resource for the second-type carrier.

Optionally, the network device may allocate the first transmission resource for the first-type carrier and the second-type carrier to the terminal without any request from the terminal device.

Optionally, the first information may be system information or dedicated RRC signaling.

It is to be understood that the operations in the method 700 for resource configuration may refer to descriptions about the corresponding operations in the method 200 for resource configuration and, for simplicity, will not be elaborated herein.

Accordingly, in the method for resource configuration of the embodiment of the application, the network device may directly indicate the first transmission resource for the first-type carrier and the second-type carrier, and then the terminal device may determine a second transmission resource for transmitting data based on the first transmission resource and may further achieve the purpose of aggregated transmission on the first-type carrier and the second-type carrier, so that data transmission efficiency is improved.

Figure 10:
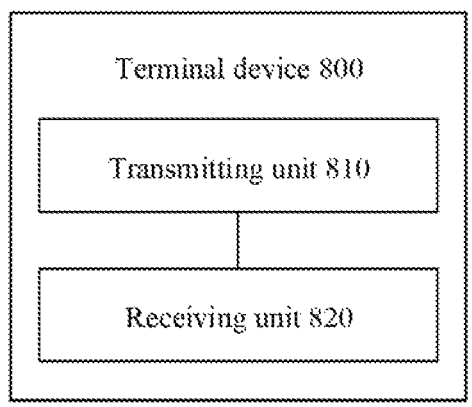
FIG. 10 is a schematic block diagram of a terminal device according to an embodiment of the application.

FIG. 10 is a schematic block diagram of a terminal device 800 according to an embodiment of the application. As shown in FIG. 10, the terminal device 800 includes a transmitting unit 810 and a receiving unit 820.

The transmitting unit 810 is configured to transmit first information to a network device, the first information including capability information, the capability information being for indicating a capability in simultaneous transmission and reception on multiple carriers, the multiple carriers including a first-type carrier and a second-type carrier, the first-type carrier being configured to transmit data on an SL and the second-type carrier being configured to transmit data on at least one of a UL, a DL and the SL.

The receiving unit 820 is configured to receive second information from the network device, the second information being for indicating a first transmission resource, allocated by the network device, for the first-type carrier and the second-type carrier and indicating a valid time of the first transmission resource.

Optionally, the first information may further include request information, the request information being for requesting for aggregated data transmission on the multiple carriers.

Optionally, before the first information is transmitted to the network device, the receiving unit 820 may be further configured to receive third information from the network device, the third information including first-type carrier information and the third information being for instructing the network device to allocate a resource for the first-type carrier.

Optionally, the third information may be system information or dedicated RRC signaling.

Optionally, the terminal device may further include a processing unit 830.

The processing unit 830 is configured to determine a second transmission resource based on the first transmission resource.

The transmitting unit 810 is further configured to transmit data on the second transmission resource.

Optionally, the processing unit 830 may be further configured to determine the second transmission resource from the first transmission resource.

Optionally, the processing unit 830 may be further configured to determine the second transmission resource from the first transmission resource according to at least one of a CBR, the capability in simultaneous transmission and reception on the multiple carriers, transmitting power and priority of a transmitted service.

Optionally, the transmitting unit 810 may be further configured to transmit the data on the second transmission resource within the valid time of the first transmission resource.

Optionally, the first transmission resource may be a semi-persistent scheduling resource and/or a shared resource pool.

Optionally, the receiving unit 820 may be further configured to receive data on a third transmission resource, the third transmission resource being configured by the network device through system information and the third transmission resource including the first-type carrier.

Optionally, the receiving unit 820 may be further configured to receive the data on a fourth transmission resource, the fourth transmission resource being configured by the network device and the fourth transmission resource including the second-type carrier.

It is to be understood that the terminal device 800 according to the embodiment of the application may correspond to the terminal device in the method 200 of the application and the above-mentioned and other operations and/or functions of each unit in the terminal device 800 are adopted to implement the corresponding flows executed by the terminal device in the method 200 shown in FIG. 4 respectively and will not be elaborated herein for simplicity.

Figure 11:
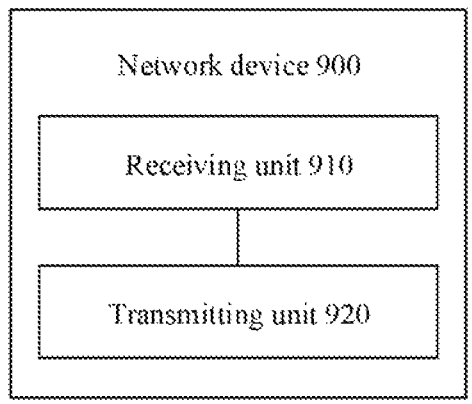
FIG. 11 is a schematic block diagram of a network device according to an embodiment of the application.

FIG. 11 is a schematic block diagram of a network device 900 according to an embodiment of the application. As shown in FIG. 11, the network device 900 includes a receiving unit 910 and a transmitting unit 920.

The receiving unit 910 is configured to receive first information from a terminal device, the first information including capability information, the capability information being for indicating a capability of the terminal device in simultaneous transmission and reception on multiple carriers, the multiple carriers including a first-type carrier and a second-type carrier, the first-type carrier being configured to transmit data on an SL and the second-type carrier being configured to transmit data on at least one of a UL, a DL and the SL.

The transmitting unit 920 is configured to transmit second information to the terminal device based on the first information, the second information being for indicating a first transmission resource, allocated by the network device, for the first-type carrier and the second-type carrier and indicating a valid time of the first transmission resource.

Optionally, the first information may further include request information, the request information being for requesting for aggregated data transmission on the multiple carriers.

Optionally, before the first information transmitted by the terminal device is received, the transmitting unit 920 may be further configured to transmit third information to the terminal device, the third information including first-type carrier information and the third information being for instructing the network device to allocate a resource for the first-type carrier.

Optionally, the third information may be system information or dedicated RRC signaling.

Optionally, the first transmission resource may be a semi-persistent scheduling resource and/or a shared resource pool.

Optionally, the transmitting unit 920 may be further configured to transmit fourth information to the terminal device, the fourth information being for indicating a third transmission resource, the third transmission resource being a resource for data reception of the terminal device and the third transmission resource including the first-type carrier.

It is to be understood that the network device 900 according to the embodiment of the application may correspond to the network device in the method 300 of the application and the above-mentioned and other operations and/or functions of each unit in the network device 900 are adopted to implement the corresponding flows executed by the network device in the method 300 shown in FIG. 5 respectively and will not be elaborated herein for simplicity.

Figure 12:
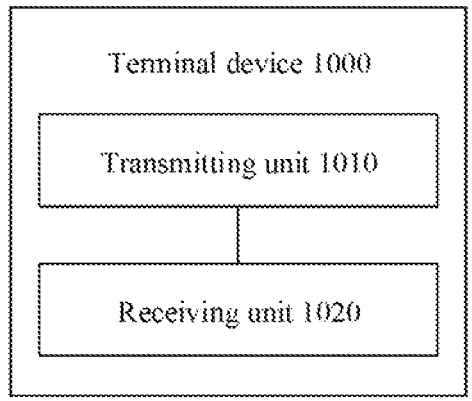
FIG. 12 is a schematic block diagram of another terminal device according to an embodiment of the application.

FIG. 12 is a schematic block diagram of a terminal device 1000 according to an embodiment of the application. As shown in FIG. 12, the terminal device 1000 includes a transmitting unit 1010 and a receiving unit 1020.

The transmitting unit 1010 is configured to transmit first information to a network device, the first information including capability information, the capability information being for indicating a capability in simultaneous transmission and reception on multiple carriers, the multiple carriers including a first-type carrier and a second-type carrier, the first-type carrier being configured to transmit data on an SL and the second-type carrier being configured to transmit data on at least one of a UL, a DL and the SL.

The receiving unit 1020 is configured to receive second information from the network device, the second information being for indicating a first transmission resource, allocated by the network device, for the second-type carrier and for indicating a valid time of the first transmission resource.

Optionally, the first information may further include request information, the request information being for requesting for aggregated data transmission on the multiple carriers.

Optionally, the terminal device may further include a processing unit 1030.

The processing unit 1030 may be configured to determine a second transmission resource for the first-type carrier based on the first transmission resource and a CBR on the first-type carrier.

Optionally, the processing unit 1030 may be further configured to determine a third transmission resource based on the first transmission resource and the second transmission resource.

The transmitting unit 1010 may be further configured to transmit data on the third transmission resource.

Optionally, the processing unit 1030 may be further configured to determine the third transmission resource from the first transmission resource and/or the second transmission resource.

Optionally, the processing unit 1030 may be further configured to determine the third transmission resource from the first transmission resource and/or the second transmission resource according to at least one of a CBR, the capability in simultaneous transmission and reception on the multiple carriers, transmitting power and priority of a transmitted service.

Optionally, if the transmitting power is larger than or equal to preset power, multiple carriers in the third transmission resource overlap in a time domain, and/or if the transmitting power is lower than the preset power, the multiple carriers in the third transmission resource do not overlap in the time domain.

Optionally, the transmitting unit 1010 may be further configured to transmit the data on the second transmission resource within the valid time of the first transmission resource.

Optionally, the first transmission resource may be a semi-persistent scheduling resource and/or a shared resource pool.

Optionally, the receiving unit 1020 may be further configured to receive the data on a fourth transmission resource, the fourth transmission resource being configured by the network device and the fourth transmission resource including the second-type carrier.

It is to be understood that the terminal device 1000 according to the embodiment of the application may correspond to the terminal device in the method 400 of the application and the above-mentioned and other operations and/or functions of each unit in the terminal device 1000 are adopted to implement the corresponding flows executed by the terminal device in the method 400 shown in FIG. 6 respectively and will not be elaborated herein for simplicity.

Figure 13:
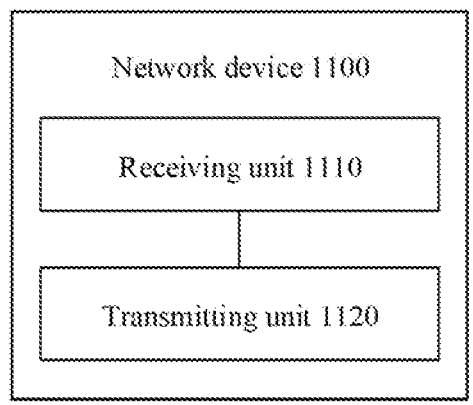
FIG. 13 is a schematic block diagram of another network device according to an embodiment of the application.

FIG. 13 is a schematic block diagram of a network device 1100 according to an embodiment of the application. As shown in FIG. 13, the network device 1100 includes a receiving unit 1110 and a transmitting unit 1120.

The receiving unit 1110 is configured to receive first information from a terminal device, the first information including capability information, the capability information being for indicating a capability in simultaneous transmission and reception on multiple carriers, the multiple carriers including a first-type carrier and a second-type carrier, the first-type carrier being configured to transmit data on an SL and the second-type carrier being configured to transmit data on at least one of a UL, a DL and the SL.

The transmitting unit 1120 is configured to transmit second information to the terminal device based on the first information, the second information being for indicating a first transmission resource, allocated by the network device, for the second-type carrier and for indicating a valid time of the first transmission resource.

Optionally, the first information may further include request information, the request information being for requesting for aggregated data transmission on the multiple carriers.

Optionally, the first transmission resource may be a semi-persistent scheduling resource and/or a shared resource pool.

Optionally, the transmitting unit 1120 may be further configured to transmit third information to the terminal device, the third information being for indicating a second transmission resource, the second transmission resource being a resource for data reception of the terminal device and the second transmission resource including the second-type carrier.

It is to be understood that the network device 1100 according to the embodiment of the application may correspond to the network device in the method 500 of the application and the above-mentioned and other operations and/or functions of each unit in the network device 1100 are adopted to implement the corresponding flows executed by the network device in the method 500 shown in FIG. 7 respectively and will not be elaborated herein for simplicity.

Figure 14:
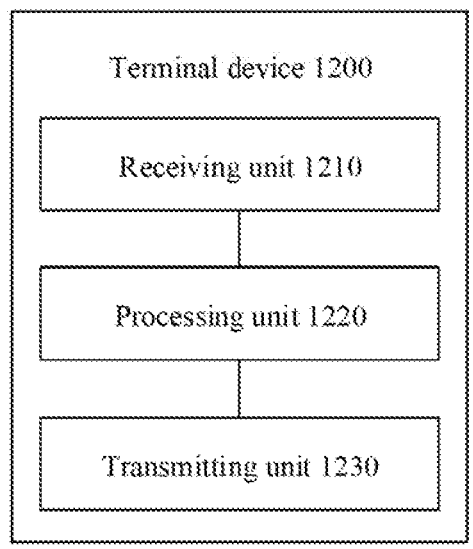
FIG. 14 is a schematic block diagram of yet another terminal device according to an embodiment of the application.

FIG. 14 is a schematic block diagram of a terminal device 1200 according to an embodiment of the application. As shown in FIG. 14, the terminal device 1200 includes a receiving unit 1210, a processing unit 1220 and a transmitting unit 1230.

The receiving unit 1210 is configured to receive first information from a network device, the first information being for indicating a first transmission resource, allocated by the network device, for multiple carriers and for indicating a valid time of the first transmission resource the multiple carriers may include a first-type carrier and a second-type carrier, the first-type carrier may be configured to transmit data on an SL, the second-type carrier may be configured to transmit data on at least one of a UL, a DL and the SL, and the first transmission resource may be a shared resource pool.

The processing unit 1220 is configured to determine a second transmission resource based on the first transmission resource.

The transmitting unit 1230 is configured to transmit data on the second transmission resource.

Optionally, the processing unit 1220 may be further configured to determine the second transmission resource from the first transmission resource.

Optionally, the first information may be system information or dedicated RRC signaling.

Optionally, the processing unit 1220 may be further configured to determine a third transmission resource from the first transmission resource.

The transmitting unit 1230 may be further configured to receive data on the third transmission resource.

It is to be understood that the terminal device 1200 according to the embodiment of the application may correspond to the terminal device in the method 600 of the application and the above-mentioned and other operations and/or functions of each unit in the terminal device 1200 are adopted to implement the corresponding flows executed by the terminal device in the method (600 shown in FIG. 8 respectively and will not be elaborated herein for simplicity.

Figure 15:
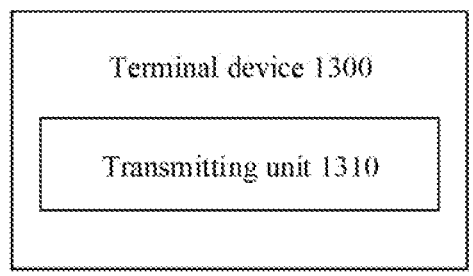
FIG. 15 is a schematic block diagram of still another network device according to an embodiment of the application.

FIG. 15 is a schematic block diagram of a network device 1300 according to an embodiment of the application. As shown in FIG. 15, the network device 1300 includes a transmitting unit 1310.

The transmitting unit 1310 is configured to transmit first information to a terminal device, the first information being for indicating a first transmission resource, allocated to the terminal device, for multiple carriers and for indicating a valid time of the first transmission resource; the multiple carriers may include a first-type carrier and a second-type carrier, the first-type carrier is configured to transmit data on an SL the second-type carrier is configured to transmit data on at least one of a UL, a DL and the SL, and the first transmission resource may be a shared resource pool.

Optionally, the first information may be system information or dedicated RRC signaling.

It is to be understood that the network device 1300 according to the embodiment of the application may correspond to the network device in the method 700 of the application and the above-mentioned and other operations and/or functions of each unit in the network device 1300 are adopted to implement the corresponding flows executed by the network device in the method 700 shown in FIG. 9 respectively and will not be elaborated herein for simplicity.

Figure 16:
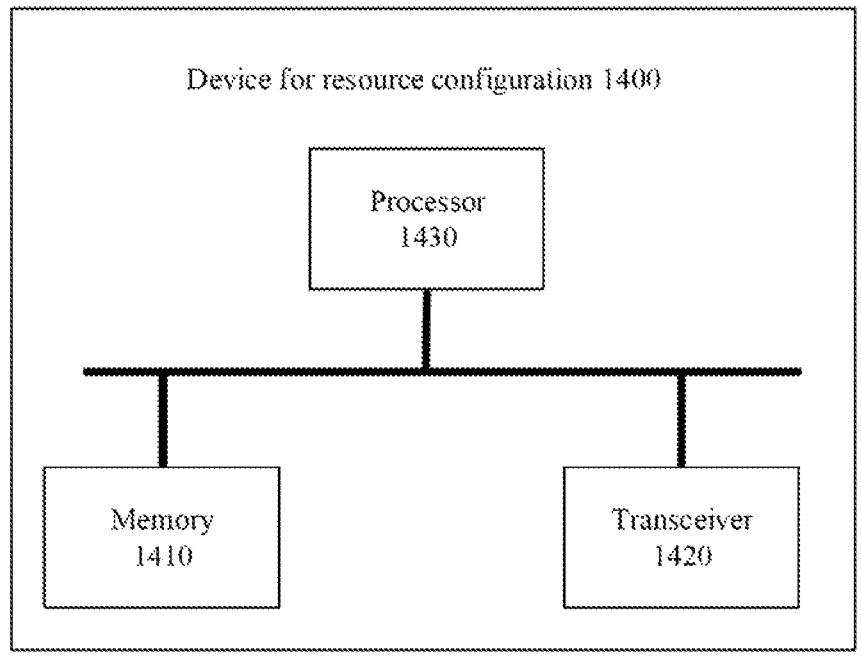
FIG. 16 is a schematic block diagram of a device for resource configuration according to an embodiment of the application.

FIG. 16 is a schematic block diagram of a device for resource configuration 1400 according to an embodiment of the application. The device 1400 includes a memory 1410, a transceiver 1420 and a processor 1430.

The memory 1410 is configured to store a program, the program including a code.

The transceiver 1420 is configured to communicate with another device.

The processor 1430 is configured to execute the program code in the memory 1410.

Optionally, when the code is executed, the processor 1430 may implement each operation executed by a terminal device in the method 200 in FIG. 4 or the method 400 in FIG. 6 or the method 600 in FIG. 8. For simplicity, elaborations are omitted herein. In such cases, the device 1400 may be a terminal device (for example, a mobile phone). The transceiver 1420 is configured to execute specific signal transmission and reception under driving of the processor 1430.

Optionally, when the code is executed, the processor 1430 may implement each operation executed by a network device in the method 300 in FIG. 5 or the method 500 in FIG. 7 or the method 700 in FIG. 9. For simplicity, elaborations are omitted herein. In such cases, the device 1400 may be a network device (for example, an access network device or a core network device).

It is to be understood that, in the embodiment of the application, the processor 1430 may be a Central Processing Unit (CPU) and the processor 1430 may also be another universal processor, a Digital Signal Processor (DSP), an Application Specific Integrated Circuit (ASIC), a Field Programmable Gate Array (FPGA) or other programmable logic devices, a discrete gate or a transistor logic device and a discrete hardware component and the like. The universal processor may be a microprocessor or the processor may also be any conventional processor and the like.

The memory 1410 may include a Read-Only Memory (ROM) and a Random Access Memory (RAM) and provide an instruction and data for the processor 1430. A part of the memory 1410 may further include a nonvolatile RAM. For example, the memory 1410 may further store information of a device type.

The transceiver 1420 may be configured to realize functions of signal transmission and reception, for example, frequency modulation and demodulation functions or up-conversion and down-conversion functions.

In an implementation process, at least one operation of the method may be completed through an integrated logical circuit of hardware in the processor 1430, or the integrated logical circuit may complete the at least one operation under driving of an instruction in a software form. Therefore, the device 1400 for resource configuration may be a chip or a chip set. The operations of the method in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory, and the processor 1430 reads information in the memory, and completes the operations of the methods in combination with hardware. No more detailed descriptions will be made herein to avoid repetitions.

Figure 17:
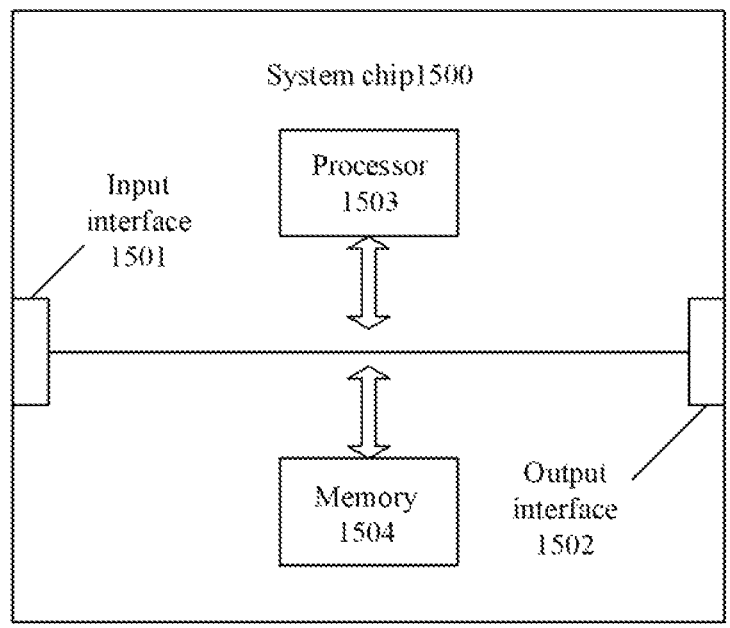
FIG. 17 is a schematic structure diagram of a system chip according to an embodiment of the application.

FIG. 17 is a schematic structure diagram of a system chip 1500 according to an embodiment of the application. The system chip 1500 of FIG. 17 includes an input interface 1501, an output interface 1502, a processor 1503 and a memory 1504 which may be connected through an internal communication connecting line with each other. The processor 1503 is configured to execute a code in the memory 1504.

Optionally, when the code is executed, the processor 1503 implements methods executed by a terminal device in the method embodiments. For simplicity, no more elaborations will be made herein.

Optionally, when the code is executed, the processor 1503 implements methods executed by a network device in the method embodiments. For simplicity, no more elaborations will be made herein.

Those of ordinary skill in the art may realize that the units and algorithm steps of each example described in combination with the embodiments in the disclosure may be implemented by electronic hardware or a combination of computer software and the electronic hardware. Whether these functions are executed by hardware or software depends on specific applications and design constraints of the technical solutions. Professionals may realize the described functions for each specific application by different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the system, device and method may be implemented in other manners. For example, the device embodiments described above are schematic only. For example, division of the units is only logic function division, and other division manners may be adopted during practical implementation. For example, multiple units or components may be combined or integrated into other systems, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and the parts displayed as units may or may not be physical units, which namely may be located in the same place, or may also be distributed to multiple network units. Part or all of the units may be selected to achieve the solutions of the embodiments based on a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for resource configuration, comprising:
    transmitting first information to a network device, wherein the first information comprises capability information, the capability information is for indicating a capability in simultaneous transmission and reception on multiple carriers, the multiple carriers comprises a first-type carrier and a second-type carrier, the first-type carrier is configured to transmit data on a Sidelink (SL) and the second-type carrier is configured to transmit data on at least one of an Uplink (UL), a Downlink (DL) and the SL;
    receiving second information from the network device, wherein the second information is for indicating a first transmission resource, allocated by the network device, for the first-type carrier and the second-type carrier and for indicating a valid time of the first transmission resources;
    determining a second transmission resource for aggregated data transmission on the multiple carriers based on the first transmission resource according to a Channel Busy Ratio (CBR) of each of the multiple carriers; and
    transmitting data on the second transmission resource within the valid time of the first transmission resource.

2. The method of claim 1, wherein the first information further comprises request information, and the request information is for requesting for aggregated data transmission on the multiple carriers.

3. The method of claim 1, before transmitting the first information to the network device, further comprising:
receiving third information from the network device, wherein the third information comprises first-type carrier information and is for instructing the network device to allocate a resource for the first-type carrier.

4. The method of claim 1, wherein determining the second transmission resource based on the first transmission resource further comprises:
determining the second transmission resource from the first transmission resource according to at least one of:
the capability in simultaneous transmission and reception on the multiple carriers,
transmitting power, or
priority of a transmitted service.

5. A method for resource configuration, comprising:
transmitting first information to a network device, the first information comprising capability information, wherein the capability information is for indicating a capability in simultaneous transmission and reception on multiple carriers, the multiple carriers comprises a first-type carrier and a second-type carrier, the first-type carrier is configured to transmit data on a Sidelink (SL) and the second-type carrier is configured to transmit data on at least one of an Uplink (UL), a Downlink (DL) and the SL;
receiving second information from the network device, wherein the second information is for indicating a first transmission resource, allocated by the network device, for the second-type carrier and for indicating a valid time of the first transmission resource; and
determining a second transmission resource for the first-type carrier based on the first transmission resource and a Channel Busy Ratio (CBR) on the first-type carrier.

6. The method of claim 5, further comprising:
determining a third transmission resource based on the first transmission resource and the second transmission resource; and
transmitting data on the third transmission resource.

7. The method of claim 6, wherein determining the third transmission resource based on the first transmission resource and the second transmission resource comprises:
determining the third transmission resource from the first transmission resource and/or the second transmission resource.

8. A terminal device, comprising a transceiver, wherein the transceiver is configured to:
transmit first information to a network device, wherein the first information comprises capability information, the capability information is for indicating a capability in simultaneous transmission and reception on multiple carriers, the multiple carriers comprises a first-type carrier and a second-type carrier, the first-type carrier is configured to transmit data on a Sidelink (SL) and the second-type carrier is configured to transmit data on at least one of an Uplink (UL), a Downlink (DL) and the SL;
receive second information from the network device, wherein the second information is for indicating a first transmission resource, allocated by the network device, for the first-type carrier and the second-type carrier and for indicating a valid time of the first transmission resource;
determine a second transmission resource for aggregated data transmission on the multiple carriers based on the first transmission resource according to a Channel Busy Ratio (CBR) of each of the multiple carriers; and
transmit data on the second transmission resource within the valid time of the first transmission resource.

9. The terminal device of claim 8, wherein, before the transceiver transmits the first information to the network device, the transceiver is further configured to receive third information from the network device, the third information comprising first-type carrier information and the third information being for instructing the network device to allocate a resource for the first-type carrier.

10. The terminal device of claim 8, wherein
the processor is further configured to determine the second transmission resource from the first transmission resource.

11. The terminal device of claim 10, wherein the processor is further configured to determine the second transmission resource from the first transmission resource according to at least one of the capability in simultaneous transmission and reception on the multiple carriers, transmitting power, and priority of a transmitted service.

12. The terminal device of claim 8, wherein the transmitter is further configured to receive data on a third transmission resource, the third transmission resource being configured by the network device through system information and the third transmission resource comprising the first-type carrier.

13. A terminal device, comprising a processor and a transceiver capable of being controlled by the processor for transmitting and receiving information, wherein the processor is configured to implement operations of the method of claim 5.

14. The terminal device of claim 13, wherein
the processor is further configured to determine a third transmission resource based on the first transmission resource and the second transmission resource; and
the transceiver is further configured to transmit the data on the third transmission resource.

15. The terminal device of claim 14, wherein the transmitter is further configured to transmit the data on the third transmission resource within the valid time of the first resource.

16. The terminal device of claim 13, wherein the transmitter is further configured to receive data on a fourth transmission resource, the fourth transmission resource being configured by the network device and the fourth transmission resource comprising the second-type carrier.

* * * * *